United States Patent
Verdier

[15] 3,661,425
[45] May 9, 1972

[54] HEAVY-DUTY WHEEL

[72] Inventor: Henri Verdier, Beauregard-L'Eveque, France

[73] Assignee: Compagnie Generale Des Etablissements Michelin raison sociale Michelin & Cie, Clermont-Ferrand (Puy-de-Dome), France

[22] Filed: Dec. 3, 1969

[21] Appl. No.: 881,741

[30] Foreign Application Priority Data

Dec. 11, 1968 France....................177772

[52] U.S. Cl................................301/63 R, 152/381
[51] Int. Cl........................................B60b 3/02
[58] Field of Search............152/381; 301/63 R, 63 D, 63 DD; 29/159.01

[56] References Cited

UNITED STATES PATENTS

| | | | |
|---|---|---|---|
| 1,968,005 | 7/1934 | Swain | 301/6 A X |
| 2,731,064 | 1/1956 | Powers | 152/381 X |
| 3,210,126 | 10/1965 | Travers | 301/63 |
| 3,129,496 | 4/1964 | Cox | 29/159.01 |
| 3,506,311 | 4/1970 | Nobach | 301/63 |

FOREIGN PATENTS OR APPLICATIONS

| | | | |
|---|---|---|---|
| 1,177,513 | 12/1958 | France | 301/63 |
| 434,044 | 8/1935 | Great Britain | 301/63 |

OTHER PUBLICATIONS

Budd–Wide Single Tire Wheels–Catalog B–163 Received in Patent Office 3–20–1964 Budd Automotive Detroit, Mich.

*Primary Examiner*—Richard J. Johnson
*Attorney*—Brumbaugh, Graves, Donohue & Raymond

[57] ABSTRACT

A wheel includes a well base rim, also known as a drop center rim, the well of which is offset from the median plane of the rim so as to be farther from one edge of the rim than from the other. The junction between the rim and the wheel disk is in the vicinity of the edge of the rim that is the farther from the well.

2 Claims, 2 Drawing Figures

INVENTOR
HENRI VERDIER
BY
Brumbaugh, Graves, Donohue & Raymond
his ATTORNEYS

HEAVY-DUTY WHEEL

BACKGROUND OF THE INVENTION

This invention relates to vehicle wheels and, more particularly, to novel and highly-effective wheels for vehicles in the heavy-duty class (delivery vans, trucks, motor coaches, etc.), the wheels having a rim with inclined seats on which the beads of a tire come to rest.

There has been used heretofore on heavy-duty vehicles a one-piece wheel with a well base rim also known as drop center rim (i.e., a rim formed with a large circumferential well or gutter whereby the rim is rendered generally concave towards a tire mounted thereon) and with tire-bead seats that are inclined approximately 15° with respect to the axis of the wheel. Such a wheel is provided on either side with a bead seat that on the outside ends in an edge flange. The circumferential well is generally in the center portion of the rim. The well is connected directly to one of the seats and connected to the other seat by means of a substantially cylindrical or conical part of varying size. Consequently, the profile of the rim in axial section is asymmetric.

The wheel also comprises a disk that is welded to the rim and is substantially off-set axially, whereby the plane of attachment of the wheel to the hub is beyond the edge of the rim. This disk is generally welded to the rim on the side of the bead seat closer to the center well. This facilitates mounting of the tire. The tire is put on the rim over the side to which the center well is closer, and it is easy to mount it by placing the wheel flat on the ground. For better stability of the wheel on the ground during mounting, it is thus desirable that the disk be located on the side of the tire-wheel assembly out of contact with the ground, especially if the disk is curved. Most often, the disk is welded to the rim on the rounded part connecting the bottom of the well to a lateral wall thereof.

This solution is satisfactory from the point of view of resistance to fatigue of the wheel, as indicated in U.S. Pat. No. 3,210,126. However, it is not a complete solution to the problems of wheel manufacture. First, welding of the disk to the rim in any point of the bottom or the edge of the center well limits axially the free space available to accommodate the brake elements within the rim. Second, welding of the disk to the rim in any point whatever of the edge of the well radially limits the free space for placement of the valve hole. The latter disadvantage can be eliminated by making the edge of the disk thinner, but only at the price of an additional operation increasing the cost.

It has been suggested that the wheel disk should be welded to the rim adjacent to the edge of the rim closer to the well at the outer edge of a bead seat. While this expedient saves space, it must be avoided because it lowers resistance to fatigue. Thus, one is led to increase the thickness of the rim. This not only increases the weight of the wheel and renders manufacture more costly but also increases the inner diameter of the well, and consequently the diameter available for placement of the braking elements is diminished. Moreover, a heavier wheel necessitates heavier and more expensive springs, axles, and other parts of the automotive vehicle on which the wheel is mounted, as well as more expensive equipment for making the heavier parts.

SUMMARY OF THE INVENTION

An object of the invention is to remedy the problems of conventional wheels outlined above and, more particularly, to provide a wheel having an improved attachment of the disk to the rim, without loss in resistance to fatigue and with a gain in axial space and no loss of radial space for the mounting of the brake elements inside the wheel.

The foregoing and other objects are attained in accordance with the invention by the provision of a wheel having a well base or drop center rim that is asymmetrical and has inclined tire bead seats, the wheel having the disk welded to the rim in the vicinity of the edge of the rim that is the farther from the well.

Preferably, the wheel has the following characteristics:

a. The distances a and b from the median plane of the bottom of the well respectively to the flange of the rim that is closer to, and the flange of the rim that is farther from, the well are such that the ratio b/a equals or exceeds 1.45, whereby such ratio may have a value such as 1.5, 2.0 or 2.5.

b. The radii of curvature of the rounded portions connecting the bottom of the well with the bead seat farther from the well equal or exceed 25 mm.

c. In relationship to the axis of rotation of the rim, the inclinations of the various portions of the rim between the bottom of the well and the region of connection between the rim and disk do not exceed approximately 60°.

d. The region of connection of the disk to the rim is entirely between the curved portion forming the flange of the rim and the projection onto the bead seat of the center of the bead wire in the bead of the tire or the center of the aggregate of bead wires, if there are several, in the bead.

The disk should be welded to the rim by means of two welding beads, one on either side of the disk, each bead being tangential to the disk on one side of the bead and to the rim on the other side of the bead. The two welding beads should interpenetrate each other between the disk and the rim.

It has been found that, in order to improve resistance to fatigue of the wheel, it is important to increase as much as possible the distance between the well and the zone of connection of the disk to the rim, in order to prevent a concentration of stresses in the curved zone connecting the bottom of the well to each of the lateral walls thereof or connecting such walls to the bead seats. By connecting the disk in the proximity of the flange of the rim that is the farther from the well, the stresses in the closest curved zones are reduced to a surprising extent. This effect is more pronounced if the radius of curvature of such curved zones is increased. The conventional radius of curvature ranges generally from 12 to 16 mm. An increase of 50 to 100 percent of these radii of curvature produces an appreciable effect without disturbing, and even while facilitating, the sliding of the tire bead from the well to the bead seat, and without reducing the width of the well.

BRIEF DESCRIPTION OF THE DRAWING

An understanding of additional aspects of the invention can be gained from a consideration of the following detailed description of a preferred embodiment thereof, in conjunction with the appended figures of the drawing, wherein.

DESCRIPTION OF THE PREFERRED EMBODIMENT

Figure 1:
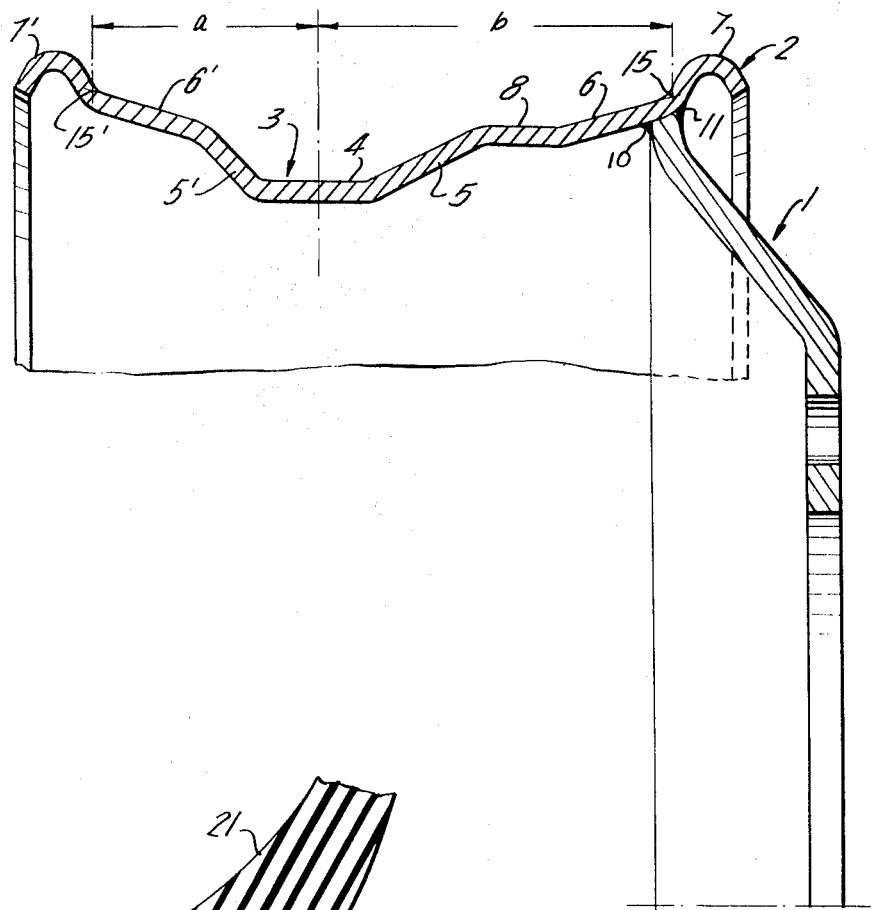
FIG. 1 is a fragmentary view in axial section of a wheel in accordance with the invention.
Figure 2:
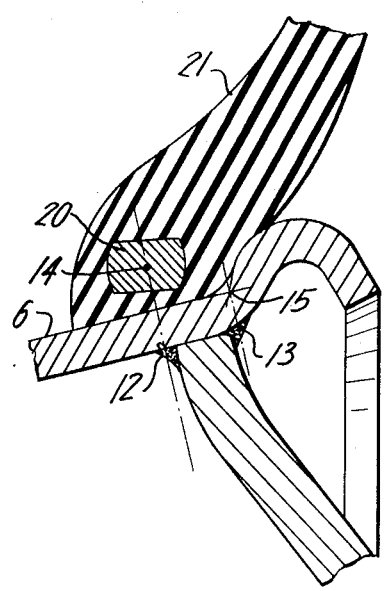
FIG. 2 is a view in axial section on a larger scale than FIG. 1 of a portion of the structure of FIG. 1.

FIGS. 1 and 2 show a wheel disk 1 joined to a well base or drop center rim 2. The rim includes a well 3 formed by a well bottom 4 and two lateral walls 5 and 5', two bead seats 6 and 6' inclined at 15° with respect to the wheel or rim axis and ending in two hook-shaped edge flanges 7 and 7', and a cylindrical portion 8. The lateral wall 5 is connected to the portion 8 and the well bottom 4 by rounded elements with a radius of curvature of at least 25 mm. whereby the lateral wall 5 is given an inclination in relation to the axis of the rim and wheel that is smaller than the inclination of the lateral wall 5'. The latter is connected to the well bottom 4 and the bead seat 6' by rounded portions with comparatively pronounced curvature: i.e., with radii of curvature of 12 to 16 mm., as customary.

The rim 1 is asymmetrical with respect to all planes that intersect the rim and that are normal to the axis of the rim.

The disk 1 is connected to the rim 2 by two welding beads 10 and 11 in the immediate proximity of the edge flange 7 of the rim: i.e., of the flange that is farther from the well 3 in an axial direction.

FIG. 2 more clearly illustrates the relative positions of the rim 2 and the disk 1. The connection between the two is effected in a zone delimited by lines 12 and 13. The line 12 is the perpendicular projection onto the lower surface (as seen in FIG. 2) of the seat 6 of the center 14 of bead wire means such as a bead wire 20, which is located in the bead 21 of the tire. The line 13 is the projection onto the lower surface (as seen in FIG. 2) of the seat 6, in a direction parallel to the projection defining the line 12, from a line 15. The line 15 is at the intersection of the continuations of the surfaces, one torus-shaped and the other conical, which in the radially outer direction delimit the edge flange 7 and the seat 6. The line 15 is the line that determines the nominal diameter of the rim in accordance with a universally shared convention.

In case the bead wire means includes several bead wires, the line 12 is projected from the center of the bead wires considered collectively.

FIG. 1 shows the line 15 and its opposite line 15' defining the distances b and a of the edges 7 and 7' from the median point of the bottom of the well 4. In this example, the distances b and a have an approximate relationship of 3 to 2: i.e., b/a is approximately 1.5.

The disk 1 is of constant thickness and is not thinner on its edge welded to the rim than elsewhere. The two welding beads 10 and 11 are joined tangentially to the disk and to the rim in such a manner as not to create any incipient fissure. They interpenetrate each other: i.e., the regions of the disk and of the rim modified by each weld are not separated from one another.

The wheel made in accordance with the invention offers a large free space to accommodate the brake elements inside the rim. Yet its resistance to fatigue is not less than if the disk were welded in the round portion connecting the bottom of the well 4 and the lateral wall 5'. In this respect, the wheel in accordance with the invention is much superior to a wheel wherein the disk is welded to the rim in the vicinity of the edge 7'.

It is within the scope of the invention to provide a uniform inclination to the portion 5 and the border 8, or the border 8 and the seat 6 or also to the three portions 5, 6 and 8. Such provisions may result in more economical manufacture.

Thus there is provided in accordance with the invention a novel and highly effective wheel that is especially adapted for use on heavy-duty vehicles. Many modifications within the spirit and scope of the invention will readily occur to those skilled in the art, and the invention includes all of the embodiments thereof within the scope of the appended claims.

I claim:

1. A wheel for vehicles in the heavy-duty class comprising a drop center rim, said rim being formed with a circumferential well which is offset from the median plane of said rim so as to be farther from one edge of said rim that from the other, said rim being asymmetrical with respect to all planes that intersect said rim and that are normal to the axis of said rim, a disk, and a weld effecting a junction between said rim and said disk, said weld junction being adjacent to the edge of said rim that is the farther from said well, wherein the ratio of the distance from the median plane of said well to the farther of said edges to the distance from the median plane of said well to the nearer of said edges is at least 1.45, and wherein all portions of said rim between the bottom of said well and said weld junction are inclined with respect to the axis of said rim at an angle not exceeding 60°, said rim being further formed, between said well and said edge that is the farther from said well, with a bead seat and, between the bottom of said well and said bead seat, with at least one part rounded in axial profile, said rounded part having a radius of curvature of at least 25 mm.

2. A wheel assembly comprising a tire, bead wire means positioned in said tire, a drop center rim for mounting said tire, said rim being formed with a circumferential well which is offset from the median plane of said rim so as to be farther from one edge of said rim than from the other, said rim being asymmetrical with respect to all planes that intersect said rim and that are normal to the axis of said rim, a disk, and means effecting a junction between said rim and said disk, said junction being in the vicinity of the edge of said rim that is the farther from said well, wherein the ratio of the distance from the median plane of said well to the farther of said edges to the distance from the median plane of said well to the nearer of said edges is at least 1.45, wherein all portions of said rim between the bottom of said well and said junction are inclined with respect to the axis of said rim at an angle not exceeding 60°, wherein said edge of said rim that is the farther from said well is defined by a curved flange facilitating retention on said rim of said tire, wherein said rim is formed with a bead seat adjacent to said flange, and wherein said junction is between said flange and a perpendicular projection onto said seat of the center of said bead wire means.

* * * * *